(12) United States Patent
Mühlberger et al.

(10) Patent No.: US 6,592,186 B1
(45) Date of Patent: Jul. 15, 2003

(54) DRIVING MECHANISM OF A HEIGHT ADJUSTMENT DEVICE FOR SEATS FOR A VEHICLE SEAT

(75) Inventors: Joachim Mühlberger, Grünstadt (DE); Kai Schumann, Rieschweiler (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 66 days.

(21) Appl. No.: 09/831,434
(22) PCT Filed: Aug. 30, 2000
(86) PCT No.: PCT/EP00/08434
§ 371 (c)(1),
(2), (4) Date: May 23, 2001
(87) PCT Pub. No.: WO01/17816
PCT Pub. Date: Mar. 15, 2001

(30) Foreign Application Priority Data

Sep. 9, 1999  (DE) ......................... 199 42 995
Jun. 6, 2000  (DE) ......................... 100 27 866

(51) Int. Cl.[7] .................................. A47C 1/02
(52) U.S. Cl. .................................. 297/344.12
(58) Field of Search ................ 297/344.12, 362, 297/344.15

(56) References Cited

U.S. PATENT DOCUMENTS

| 4,063,626 A | 12/1977 | Solomon |
| 4,143,905 A | 3/1979 | Hensel et al. |
| 4,576,412 A | 3/1986 | Terada |
| 4,762,366 A | 8/1988 | Bauer et al. |
| 4,997,223 A | 3/1991 | Croft |
| 5,109,963 A | 5/1992 | Husted et al. |
| 5,460,253 A | 10/1995 | Ritter et al. |
| 5,590,931 A | 1/1997 | Fourrey et al. |
| 6,212,965 B1 | 4/2001 | Hochmuth |
| 6,253,894 B1 | 7/2001 | Schumann et al. |
| 6,422,651 B1 | 7/2002 | Muhlberger et al. |

FOREIGN PATENT DOCUMENTS

| DE | 26 59 308 A1 | 7/1978 |
| DE | 31 34 298 A1 | 3/1983 |
| DE | 35 09 211 A1 | 9/1985 |
| DE | 36 08 858 A1 | 10/1987 |
| DE | 36 16 164 A1 | 11/1987 |
| DE | 37 34 363 A1 | 4/1989 |
| DE | 39 03 652 C2 | 8/1990 |
| DE | 41 29 515 A1 | 3/1993 |
| DE | 44 00 910 A1 | 7/1995 |
| DE | 44 46 741 A1 | 6/1996 |
| DE | 195 40 631 A1 | 5/1997 |
| DE | 196 33 011 A1 | 2/1998 |
| DE | 197 25 899 A1 | 12/1998 |
| DE | 198 03 448 A1 | 8/1999 |
| EP | 0 631 901 A1 | 1/1995 |
| EP | 0 751 030 A1 | 1/1997 |
| WO | WO 93/08410 A1 | 4/1993 |

*Primary Examiner*—Milton Nelson, Jr.
(74) *Attorney, Agent, or Firm*—Alston & Bird LLP

(57) ABSTRACT

In a seat height adjuster drive (10) for a vehicle seat, in particular for an automobile seat, with a manually actuatable lever (20), which is adapted for movement from an idle position within two sector ranges corresponding to the two directions of adjustment for moving a component of the seat height adjuster drive (10) in one direction, the sector ranges for the two adjustment ranges are different.

25 Claims, 8 Drawing Sheets

DRIVING MECHANISM OF A HEIGHT ADJUSTMENT DEVICE FOR SEATS FOR A VEHICLE SEAT

BACKGROUND OF THE INVENTION

The present invention relates to a seat height adjuster drive for a vehicle seat, in particular for an automobile seat.

DE 44 00 910 A1 discloses a known seat height adjuster drive, whose stepping mechanism enables a pumping motion that is symmetrical in both directions of adjustment. As a result, a shaft is driven, which in turn adjusts the seat structure of the vehicle seat by means of a gearing. During the pumping motion of a lever, a force is transmitted by means of an entraining element, which engages a gear. At the same time, a freewheel is released, which prevents the shaft from rotating back in the blocked direction. Since the lever is manually actuated, the possible swing range of the lever in each direction is limited to about 20° to 25°.

SUMMARY OF THE INVENTION

In accordance with one aspect of the present invention, an improved seat height adjuster drive is provided. In accordance with this aspect, the seat height adjuster drive includes a drive with a manually actuatable lever mounted for movement from an idle position within two sector ranges that are different from one another. The drive is responsive to movement of the lever within a first of the sector ranges to rotate a rotatable component of the drive and thereby cause movement of the drive in a first adjustment direction. The seat height adjuster drive also includes a releasable freewheel for releasably blocking rotation of the rotatable component. The releasable freewheel is responsive to movement of the lever through a second of the sector ranges to allow movement of the drive in a second adjustment direction.

As a result of having different sector ranges for both directions of adjustment (namely asymmetric with respect to the idle position), a larger swing range of the lever is available for one adjustment direction (preferably the upward movement). In comparison with the state of the art, it is therefore possible to reduce, with the same sum of the sector ranges, selectively the number of necessary lever strokes, or to increase the transmission. In the latter case, a smaller leverage needs to be applied, and the capacity of absorbing crash forces is increased. Preferably, the upward directed adjustment of the vehicle seat occurs upward in a pumping motion by means of the lever, whereas the downward directed adjustment of the vehicle seat occurs downward by a downward movement, which is released, for example, by the lever. The downward movement may then occur alone with the aid of the force of weight.

It will be of advantage, when the freewheel can be released in two directions independently of the drive. As a block, the freewheel prevents an unwanted rotation of a shaft. In the case of the adjustment direction with the smaller swing range (normally the downward direction), it is possible to release the freewheel such that the component of the seat height adjuster drive that is to be moved, for example, a shaft, is capable of performing a plurality of rotations. This permits the downward movement in one step assisted by the force of weight. To be able to use components that are easy to make, the freewheel preferably comprises operative surfaces arranged on the outside, preferably integral with the seat structure. The freewheel is designed and constructed preferably symmetrical in both directions of rotation. To be able to release the freewheel in both directions of rotation as desired, it is preferred to provide a switch that is actuated by the lever. To be able to release the freewheel independently of the drive, the freewheel comprises a plate cam for its release. To this end, the plate cam is to be moved opposite to the direction of movement of the lever. Preferably, the switch cooperates with a guide track arranged on the lever. The guide track is used to predetermine the possible sector ranges for the movement of the lever, which are defined by stops.

Preferably, a pawl is provided for a positive drive of a gear. The drive may also be nonpositive, for example by a further freewheel. In a preferred embodiment, springs that engage the pawl may be used both to keep the lever in its idle position or return it to same, and to engage and hold the pawl against the gear. In comparison with the known seat height adjuster drive, the drive of the present invention can do with a lesser number of components for securing the idle position of the lever, for example with two simple tension springs without additional components. The pawl is movable at least in part independently of the lever, preferably by being pivotably mounted to a guide bar. This enables an advance movement of the lever, for example, for releasing the freewheel. At the same time, the pawl may serve as an antirotation device, i.e., prevent unwanted rotations of the gear caused by vibratory loads. In the idle position, a connecting pin may lie between the pawl and guide bar against the housing of the seat height adjuster drive, and the pawl may be supported on the lever.

In a preferred embodiment, a loop or friction spring is provided, which is used to disengage the pawl from the gear. As a result, the lever is able to return quietly, i.e. without a so-called "rattle." The use of the friction spring is not limited to the seat height adjuster drive of the present invention. Rather, it may be used in any stepping mechanism or the like, wherein toothed surfaces must be guided past one another, which should occur quietly. For example, the friction spring opens when being entrained by the guide bar. It closes upon contact with the pawl, and otherwise it tightens to a certain extent, i.e., it moves relative to the body, about which it loops, not because of friction. Depending on the geometric design of the ends of the friction spring, entrainment by the guide bar may occur always at the same end or at the end leading in the direction of rotation.

In a preferred embodiment, the control elements for switching the freewheel are adapted for moving at least in part axially with respect to the freewheel. It is thus possible to release the freewheel in different directions. As a result, the drive for the freewheel is simplified, which makes manufacture more cost-favorable. In addition, it is possible to reduce the necessary installation space. Preferably, in one of the two directions of rotation the freewheel is releasable merely in the circumferential direction (azimuthally) by moving the control elements, whereas it is released in the other direction of rotation by turning the axial movement of the control elements into a movement in the opposite circumferential direction. The change occurs preferably by oblique surfaces. For the first-mentioned direction of rotation, the releasing movement of the freewheel is separated from the axial movement of the control elements.

To trigger the axial movement of the control elements, it is preferred to provide balls, which extend in the radial direction, and which are arranged in the circumferential direction evenly about the axis of rotation of the freewheel. Preferably, the balls are guided in guide tracks, which have a nonconstant cross section in the axial direction. A movement of the balls in the circumferential direction will then be able to cause the desired axial movement. For reasons of wear and tear, the balls preferably do not act directly upon the component with the control elements. Instead, a flat thrust washer is arranged between the balls and the control elements.

The term "seat height adjuster" is to be understood to include likewise mixed seat height and inclination adjusters, as well as mere seat inclination adjusters, wherein, for example, only certain areas of the seat change their height relative to other areas of the seat. The drive of the present invention may accordingly be used in many ways in different vehicle seats.

BRIEF DESCRIPTION OF THE DRAWINGS

In the following, the invention is described in greater detail with reference to five embodiments shown in the drawings, in which.

DETAILED DESCRIPTION OF THE INVENTION

Figure 1:
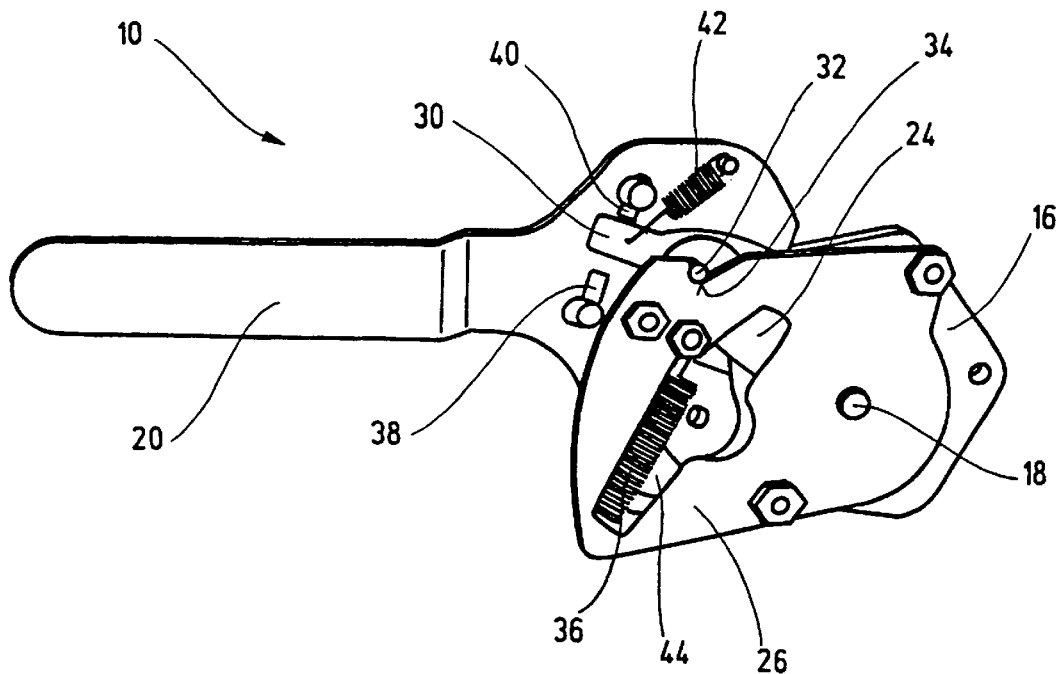
FIG. 1 is a side view of a first embodiment from the outer side of the vehicle seat.
Figure 2:
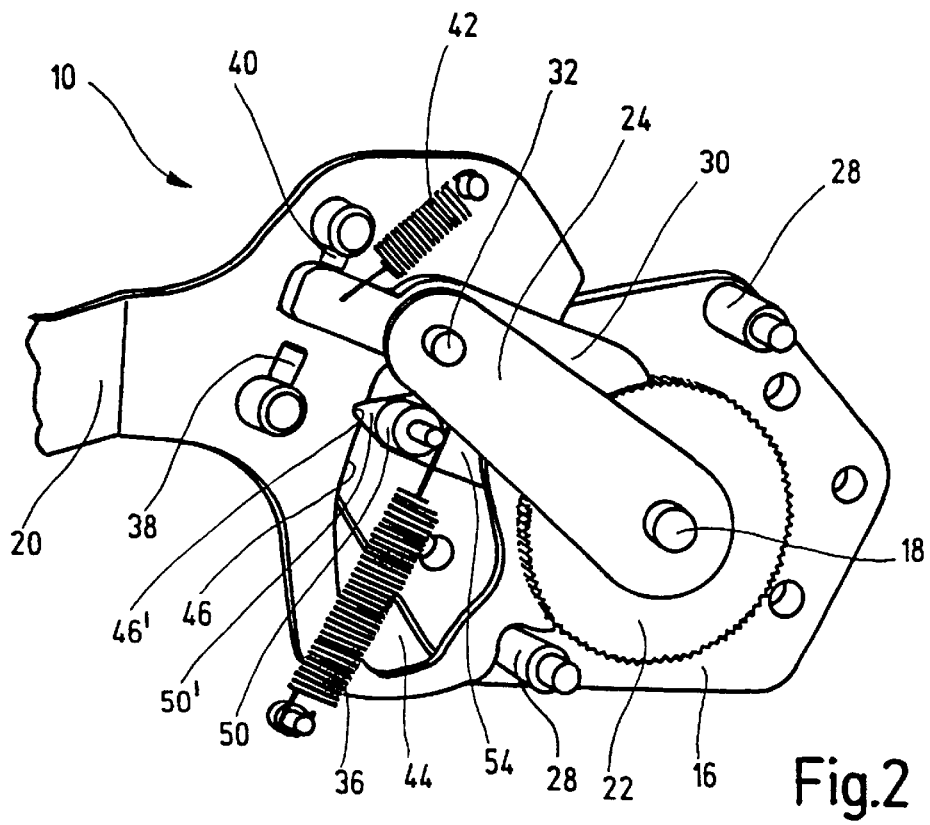
FIG. 2 is a partial view of FIG. 1, without a housing cover.
Figure 3:
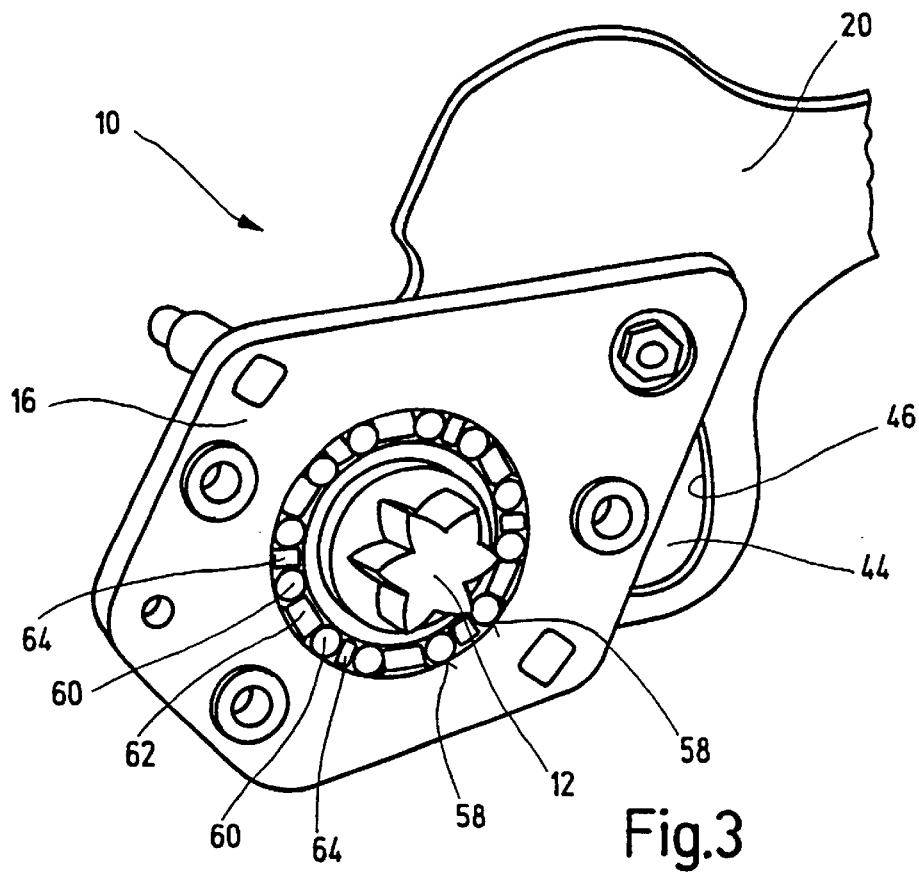
FIG. 3 is a partial view of a first embodiment, without the housing cover, from the inner side of the vehicle seat.
Figure 4:
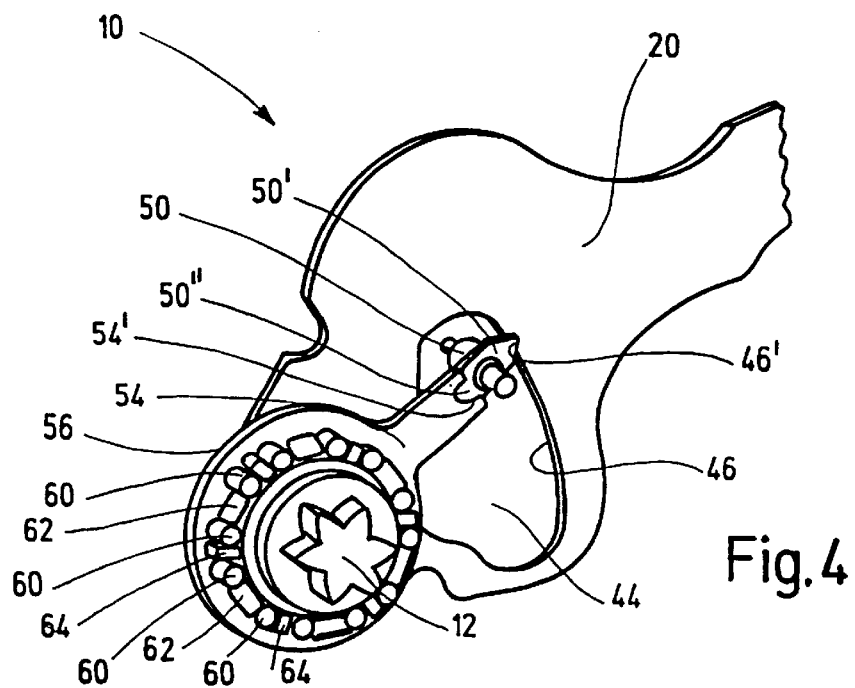
FIG. 4 is a partial view of FIG. 3 without a housing plate, gear, pawl, and guide bar.
Figure 5:
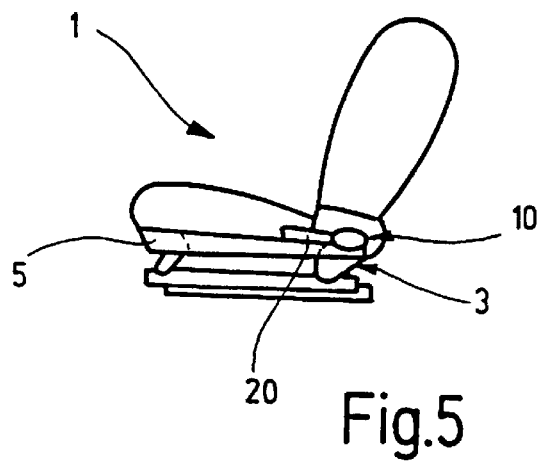
FIG. 5 is a side view of a vehicle seat according to the invention.
Figure 6:
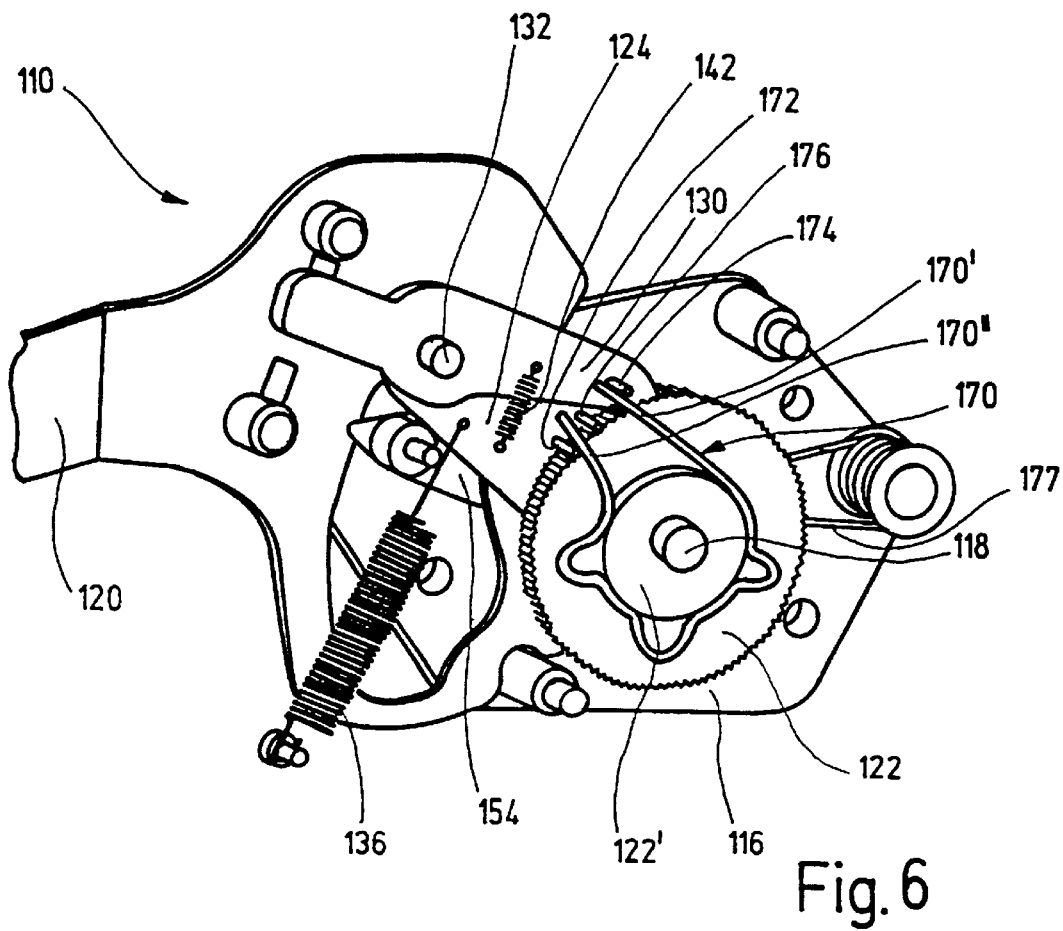
FIG. 6 is a partial view of a second embodiment according to FIG. 2.
Figure 7:
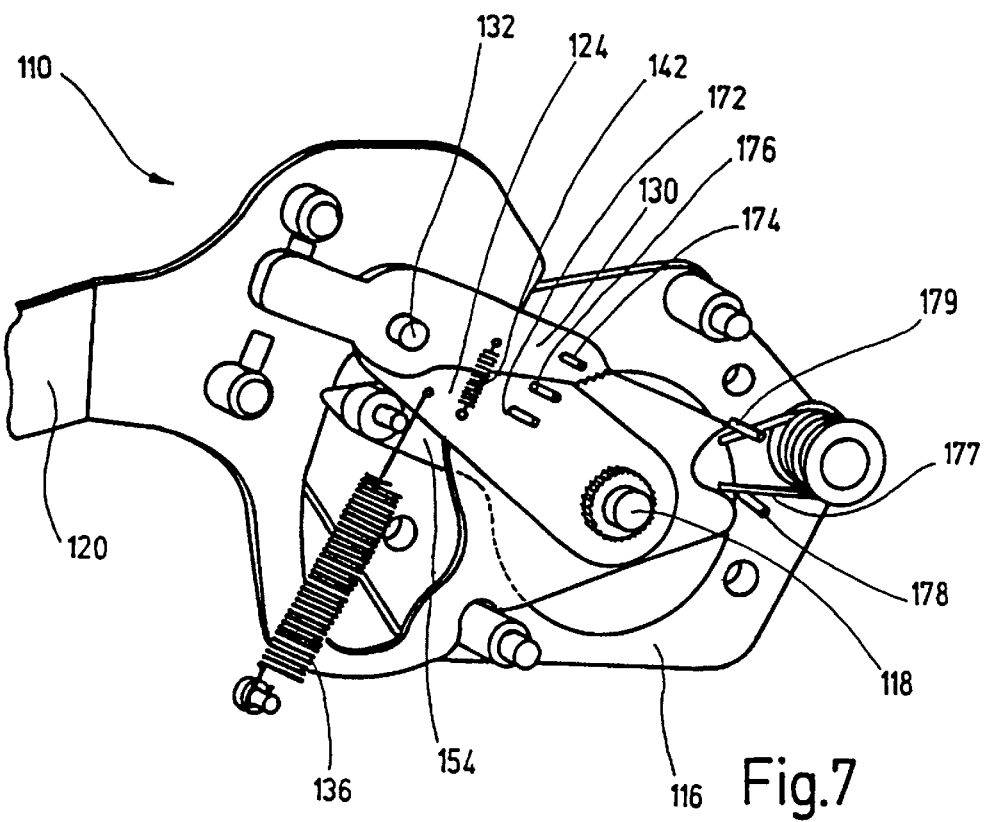
FIG. 7 is a partial view of FIG. 6 without a gear and friction spring.

In the first embodiment, a vertically adjustable vehicle seat 1 of a vehicle includes a seat support 3, which is infinitely variable by hand as regards the seat height by means of a seat height adjuster drive 10. The drive 10 for the seat height adjuster includes a pinion 12, which operatively connects via a shaft (not shown) to a movable part of seat support 3. The pinion 12 with a cylindrical section integral therewith is supported, together with a freewheel described in greater detail below, in a housing plate 16, which is connected, for example, to a seat frame 5 of seat support 3. By rotating the shaft relative to the housing plate 16, the seat height is varied.

On its outward directed end face, the pinion 12 includes a pin 18 in alignment therewith. This pin 18 extends via housing plate 16 to the outside of vehicle seat 1. Over its length, the pin 18 successively includes a first smooth section, followed by a toothed section, and a second smooth section toward its free end. The first smooth section of pin 18 mounts for pivotal movement a lever 20. The lever 20 extends forward in the driving direction and is accessible to the hand of the user of vehicle seat 1. The toothed section of pin 18 mounts a gear 22, which is thereby connected to pinion 12 for rotation therewith. The second smooth section of pin 18 mounts for pivotal movement an elongate guide bar 24 at its one end. The end of pin 18 is supported in a housing cover 26, which is arranged via spacer pins 28 parallel to the housing plate 16 and secured thereto.

A pawl 30 is pivotably connected via a connecting pin 32 to the other end of guide bar 24. The pawl 30, which is designed and constructed in the fashion of a lever, includes downward directed teeth at its rear end. With these teeth, the pawl 30 normally engages gear 22 from the top. The pawl 30 and gear 22 extend in the same plane. Normally, the connecting pin 32 lies in an indent 34 in the upper side of housing cover 26. A lower spring 36 is arranged with its one end on pawl 34 in a location between the connecting pin 32 and the teeth of pawl 30 and with its other end on housing cover 26 for keeping connecting pin 32 in contact with housing cover 26, and pawl 30 in contact with gear 22.

The lever 20 includes upper and lower entraining elements 38 and 40, which are arranged in the region of the end of pawl 30 facing away from its teeth, and which are formed, for example, by pins. An upper spring 42, is arranged with its one end on pawl 30 on the end of pawl 30 facing away from its teeth, and with its other end on lever 20 for keeping the pawl 30 in contact with upper entraining element 40. As a result thereof and because of the action of lower spring 36, the lever 20 is kept in its idle position. Furthermore, in the region between its bearing point on pin 18 and entraining elements 38 and 40, the lever 20 includes a large opening 44, whose edge facing away from pin 18 is designed and constructed as a guide track 46.

A switch 50 pivotably carried by housing plate 16 includes two cams 50' and 50", which extend transversely to the axis of rotation of the switch. In an idle position of switch 50, the cam 50' lies in a small, V-shaped cavity 46' of guide track 46. The opposite cam 50" engages with a lateral pin a slot 54' in an arm 54 of a plate cam 56. The plate cam 56 is supported on the first smooth section of pin 18 between lever 20 and housing plate 16.

The freewheel includes operative surfaces 58, which are formed on housing plate 16 in the inner circumference of the opening surrounding the cylindrical portion of pinion 12, and which extend perpendicularly or slightly obliquely to the radius of the opening. Between the housing plate 16 and the cylindrical portion of pinion 12, six pairs of braking rolls 60 extend in the circumferential direction. Each pair of braking rolls 60 is arranged in the circumferential direction of pinion 12 in the region of the two sides of one operative surface 58. Between two braking rolls 60, an elastic element 62 is arranged away from the operative surface 58. Toward the other side, an entraining element 64 of plate cam 56 is arranged in the circumferential direction between two braking rolls 60. In cooperation with the operative surfaces 58, the braking rolls 60 of a pair block respectively in the one of the two directions of rotation of the shaft. When the arm 54 of plate cam 56 is moved, i.e., the freewheel releases, the entraining elements 64 will push respectively one braking roll 60 away from the operative surface 58, so that the shaft is capable of rotating against the direction of movement of arm 54 associated to plate cam 56.

The cavity 46' of guide track 46 is asymmetrically provided within guide track 46. Thus, with respect to pin 18 as a bearing point of lever 20, the angle between cavity 46' and the upper edge of opening 44 is somewhat more than 3° to 7°, whereas the angle between cavity 46' and the lower edge of opening 44 amounts to somewhat more than 43° to 47°. Consequently, the lever 20 passes in the two different pivoting directions over different sector ranges, thereby performing different strokes. Two of the spacer pins 28 between housing plate 16 and housing cover 26 are arranged such that during a movement of lever 20, same reaches the spacer pins 28 first, which act as end stops, before switch 50 arrives at the edge of opening 44.

When the lever 20 is manually pulled upward from its idle position, the cam 50' of switch 50 is entrained by guide track 46, so that switch 50 pivots in the same direction as lever 20. The pivotal movement of switch 50 and its additional cam 50" causes arm 54 of plate cam 56 to move along via the slot-pin connection. The plate cam 56 rotates opposite to lever 20, thereby releasing via its entraining elements 64 those braking rolls 60 of the freewheel, which block together with the operative surfaces 58 in the pivoting direction of lever 20, i.e., it releases the freewheel.

The lever 20 is now able to perform a large stroke. The switch 50 remains in its pivoted position and slides along guide track 46. In so doing, the lever 20 entrains pawl 30 via its lower entraining element 38. The connecting pin 32 removes itself from indent 34. Since the pawl 30 is pivotably connected via guide bar 24 to the same pin 18, which mounts gear 22, and since it engages gear 22, the pawl 30 rotates gear 22 in formfitting engagement therewith over a certain distance in the pivoting direction of lever 20. The shaft engaging gear 22 rotates accordingly in the same direction, i.e., the drive 10 of the seat height adjuster moves seat support 3 upward.

As soon as lever 20 contacts one of spacer pins 28 between housing plate 16 and housing cover 26 after a long stroke, it is necessary to return lever 20, namely to move it again downward. The freewheel prevents the shaft from rotating back from its reached position under the torque that is operative on the driven end as a result of weight. The pawl 30 is able to remove itself from lower entraining element 38. The connecting pin 32 is again moved toward indent 34. As soon as cam 50' of switch 50 enters cavity 46' of guide track 46, the switch 50 rotates back, thereby returning arm 54 of plate cam 56, which blocks the freewheel via a displacement of braking rolls 60. The freewheel in turn blocks the shaft likewise in the just driven direction. By repeating the described sequences of movement several times, a pumping motion will result for raising seat support 3.

When the lever 20 is manually pushed downward from its idle position, the switch 50 will be rotated likewise in this direction. Via the slot-pin connection, the arm 54 of plate cam 56 is again rotated, which in turn releases the freewheel in the direction of the pivotal movement of lever 20. Because of the shorter portion of guide track 46, the lever 20 is able to perform only a short stroke. In so doing, the lever 20 comes with its upper entraining element 40 into contact with pawl 30. Since the connecting pin 32 lies in indent 34, the pawl 30 starts a pivotal movement about connecting pin 32. As a result, the pawl 30 disengages from gear 22, thereby permitting the shaft to rotate. Due to the weight of the automobile seat and of the seat user, the seat support 3 moves downward. As soon as the lever 20 is again released, the components will return to their starting position. In particular, the plate cam 56 blocks again the freewheel, and pawl 30 comes to engage gear 22.

A seat height adjuster drive 110 of the second embodiment substantially corresponds to the first embodiment. Therefore, like parts, such as for example, a housing plate 116, are provided with numerals increased by 100. As regards the arrangement of the components, a difference lies in that a guide bar 124 is arranged on a pin 118 between a lever 120 and a gear 122. A pawl 130 provided in the same plane as gear 122 is pivotably connected to guide bar 124. A lower spring 136 engages guide bar 124, whereas an upper spring 142 is operative between guide bar 124 and pawl 130. The construction of the freewheel and its switching via lever 120 by means of a switch 150 corresponds to the first embodiment.

A friction spring 170 (or loop spring) loops once (or several times) about a step 122' of gear 122. A front end 170' of friction spring 170 and a rear end 170" of friction spring 170 arranged next thereto are bent radially outward from this step 122' of gear 122. Furthermore, along this loop, the friction spring 170 includes three radially outward directed bulges, which realize a flat curve of friction spring 170, so that same is not sensitive to tolerances, when being biased accordingly. Furthermore, the bulges define a better contact of friction spring 170. The best defined contact is reached when the loop of friction spring 170 has the shape of a polygon and is in line contact with the step 122' of gear 122.

When the seat height adjuster drive 110 is to be upwardly operative, the lever 120 is first moved upward. In so doing, it entrains pawl 130. When the pawl 130 engages gear 122, the pawl 130 will rotate gear 122, which entrains with its step 122' friction spring 170 by frictional engagement, and guide bar 124, which also entrains, via a first stop 172, friction spring 170 by its rear end 170". When the pawl 130 does not engage gear 122 in its idle position, the guide bar 124 is not yet in contact with friction spring 170, i.e., the friction spring 170 remains inactive, and pawl 130 engages. Once the pawl 130 is engaged, it will entrain spring 170 via gear 122 and its step 122', and the guide bar 124 comes with its first stop 172 into contact with friction spring 170 and entrains it in addition.

As soon as the direction of lever 120 changes, i.e., when the lever 120 is returned, the guide bar 124 being biased by lower spring 136, removes itself with its first stop 172 from the rear end 170" of friction spring 170. The front end 170' of friction spring 170 pushes, via a second stop 174, upon pawl 130. In so doing, the torque of friction spring 170 increases at the same time, in that the loop of friction spring 170 tightens, i.e., friction spring 170 continues to close.

The pawl 130 pivots about connecting pin 132 and disengages from gear 122. The geometric configuration of the front end 170' of the friction spring permits adjusting the lifting kinematics. The lifting of pawl 130 is limited in that the guide bar 124 mounting a third stop 176 comes into contact with the rear end 170" of friction spring 170 and entrains same. In so doing, the torque of friction spring 170 decreases by bending open the loop of friction spring 170, i.e., by further opening friction spring 170. This facilitates the return of lever 120.

The lower spring 136 returns the guide bar 124 to its starting position, while the pawl 130 remains disengaged. This avoids a development of noise ("rattling") as the pawl 130 moves along gear 122. When the freewheel starts to rotate, the friction spring 170 will slide with its front end 170' away from pawl 130. The pawl 130 comes to engage again gear 122 by means of upper spring 142, and then operates as an antirotation device. A leg spring 177 returns lever 120 to its defined idle position. In so doing, the legs of spring 177 that are stayed relative to each other, respectively lie against a fourth and a fifth stop 178 and 179 of housing plate 116 and against lever 120.

Supported on guide bar 124, the upper spring 142 will keep pawl 130 in engagement with gear 122, unless it is raised by friction spring 170 or lever 120. For raising pawl 130 by friction spring 170, the torque of friction spring 170 is greater than the torque that upper spring 142 develops on pawl 130 at its point of engagement. The lower spring 136 pulls back guide bar 124 together with pawl 130 against the torque of friction spring 170, until the connecting pin 132 lies in the indent of the housing cover. For this reason, the lower spring 136 is designed such that it generates at any time a greater torque about pin 118 than friction spring 170.

Figure 8:
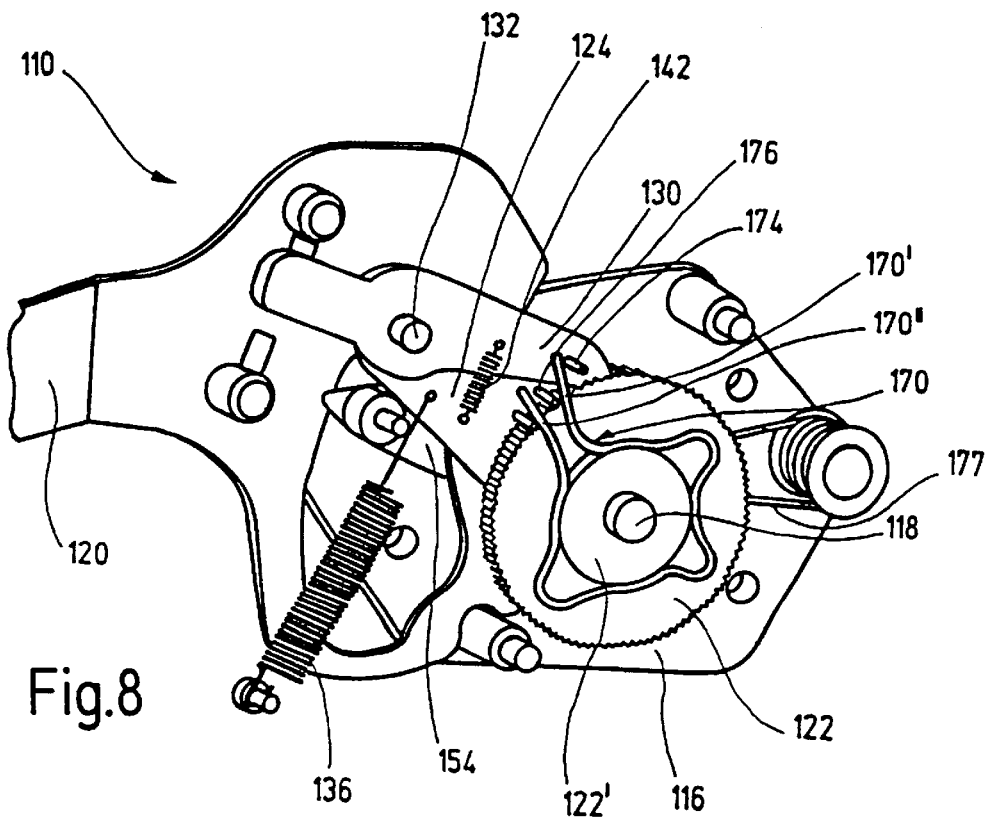
FIG. 8 is a modification of the second embodiment.

In a modified embodiment as illustrated in FIG. 8, the first stop 172 is omitted, and, depending on the direction of rotation, the guide bar 124 entrains with the third stop 176 respectively the front and the rear end 170' and 170" of friction spring 170. While being entrained, the friction spring 170 is opened, so that the torque being overcome is reduced by friction. While lifting the pawl 130, the friction spring 170 tightens, so that the desired friction serving the support increases. In this modification, the torque is decreased in both directions of rotation.

In the third embodiment, a vertically adjustable vehicle seat 201 of an automobile includes a seat support 203 with a seat frame 205. The seat support 203 is infinitely variable by hand as regards the seat height by means of a seat height adjuster drive 210. The seat height adjuster drive 210 includes a pinion 212, which operatively connects via a shaft (not shown) to a movable part of seat support 203. On its outward directed end face, the pinion 212 includes a cylindrical pin 218 made integral therewith and in alignment with the axis of rotation of pinion 212. The pin 218 is supported in a housing plate 216 and a housing cover 226 as described further below, and it is controlled, i.e. released or blocked, via a freewheel. The orientation of pinion 212 including pin 218 determines the following directional specifications. For example, the housing plate 216 is connected to the seat frame 205 of seat support 203. A rotation of the shaft relative to the housing plate 216 changes the seat height.

The freewheel is accommodated in a freewheel casing 214, which connects via a serration to pin 218 for rotation therewith. With its free end facing away from pinion 212, the pin 218 extends beyond freewheel casing 214. In its projecting portion, the pin 218 successively includes a first cylindrical section with a larger diameter and, adjacent thereto toward its free end, a second, likewise cylindrical section with a smaller diameter. The first section of pin 218 mounts for rotation an entraining gear 222. The second section of pin 218 is supported in an annular flange section 226' of housing cover 226, the flange section 226' pivotably mounting a two-arm hand-lever 227. The flange section 226' made integral with housing cover 226 may form together with the first section of pin 218 a continuous bearing of a constant diameter.

The approximately disk-shaped housing cover 226 is stationarily arranged relative to housing plate 216. In its radially outer region and evenly distributed in the circumferential direction, the housing cover 226 includes three guide tracks 229. In the circumferential direction, the guide tracks 229 have at their respectively same end a cross section, which narrows in the axial direction facing away from hand lever 227. In the region of radially surrounding flange section 226', the hand lever 227 includes, evenly distributed in the circumferential direction, three continuous cylindrical bores serving as ball guideways 231. Inside each of these ball guideways 231 a ball 233 is arranged, which comes to lie inside respectively one guide track 229 on the side facing the housing cover 226.

Between the entraining gear 222 and hand lever 227, an annular thrust washer 235 is arranged, which is radially supported on its outer side such that it is axially displaceable, but not rotatable about its axis of symmetry. In the axial direction, the thrust washer 235 lies with its one end face against entrainment gear 222 and with its other end face against three balls 233. The thrust washer 235 prevents wear and tear on entraining gear 222 by the balls 233, in that the relative movement between thrust washer 235 and entraining gear 222 is uniplanar. In the axial direction, the entraining gear 222 includes six column-shaped entraining arms 237, which project from the end face which faces housing plate 216. In the area of transition to the disk of entraining gear 222, each entraining arm is provided with a wedge surface 237', which slopes toward the entraining arm 237. All wedge surfaces 237' have the same orientation in the circumferential direction. The entraining arms 237 extend through corresponding openings in freewheel casing 214. A spring element 239 between entraining gear 222 and freewheel casing 214 pushes the entraining gear 222 into the starting position, namely such that the wedge surfaces 237' are again located outside of the freewheel casing 214.

Figure 9:
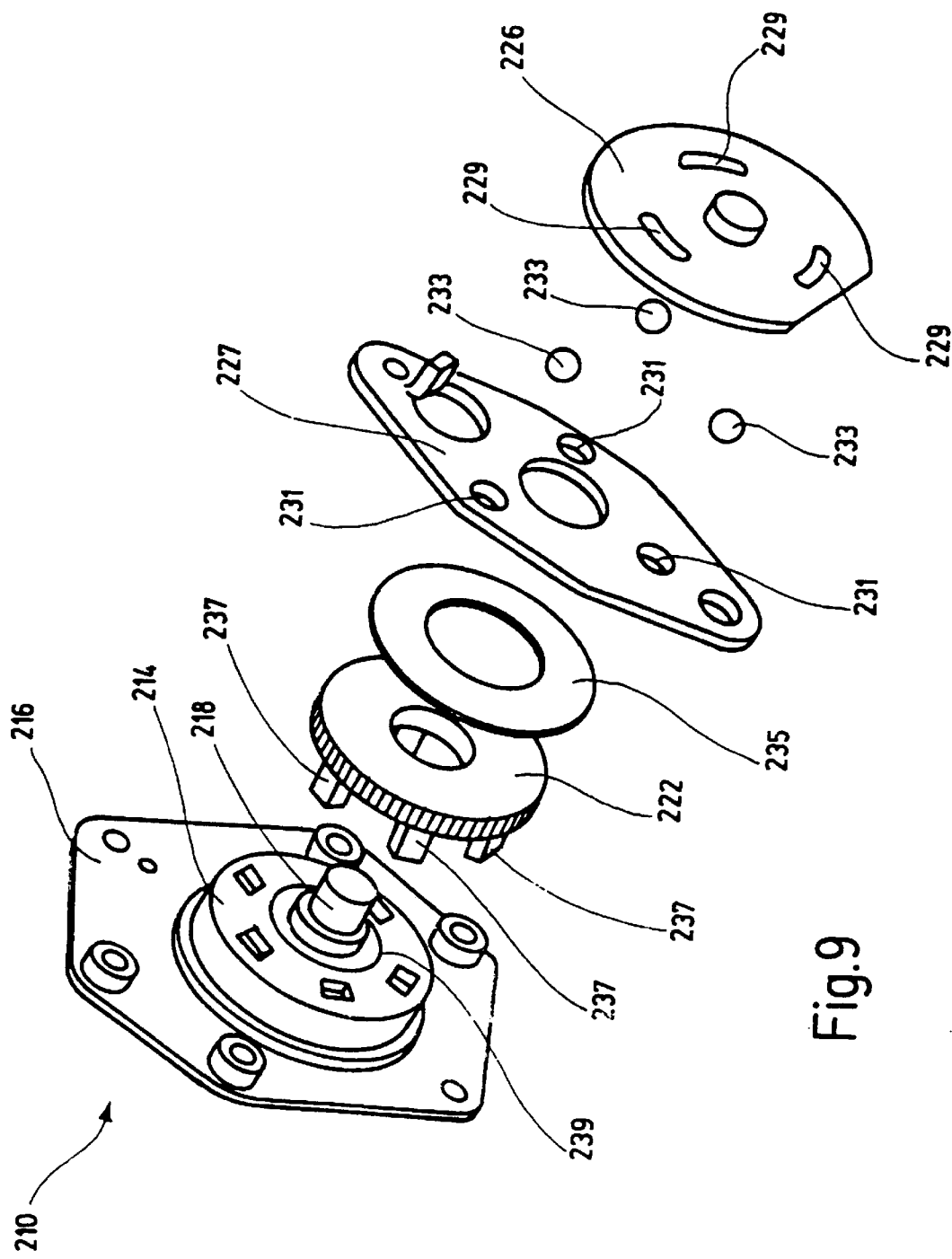
FIG. 9 is an exploded view of a third embodiment.
Figure 10:
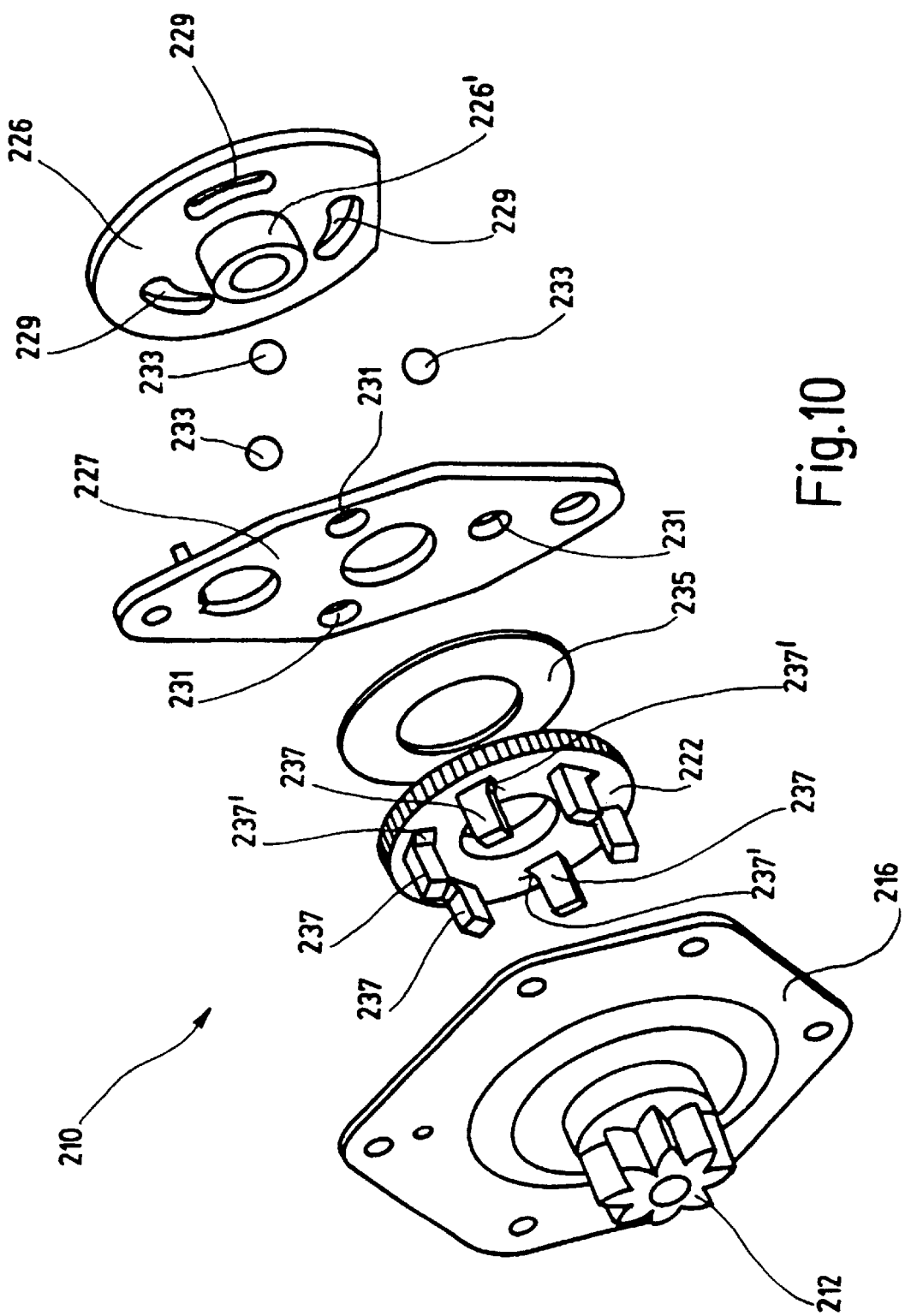
FIG. 10 is an exploded view of the third embodiment from a different perspective.
Figure 11:
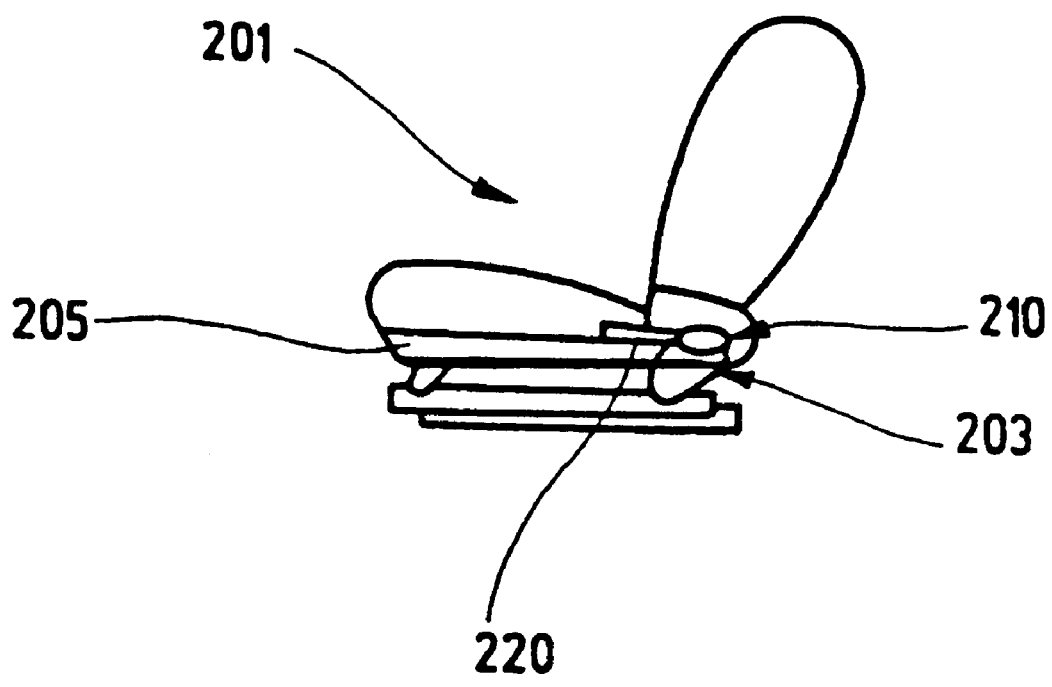
FIG. 11 is a schematic side view of a vehicle seat of the invention according to the third embodiment.
Figure 12:
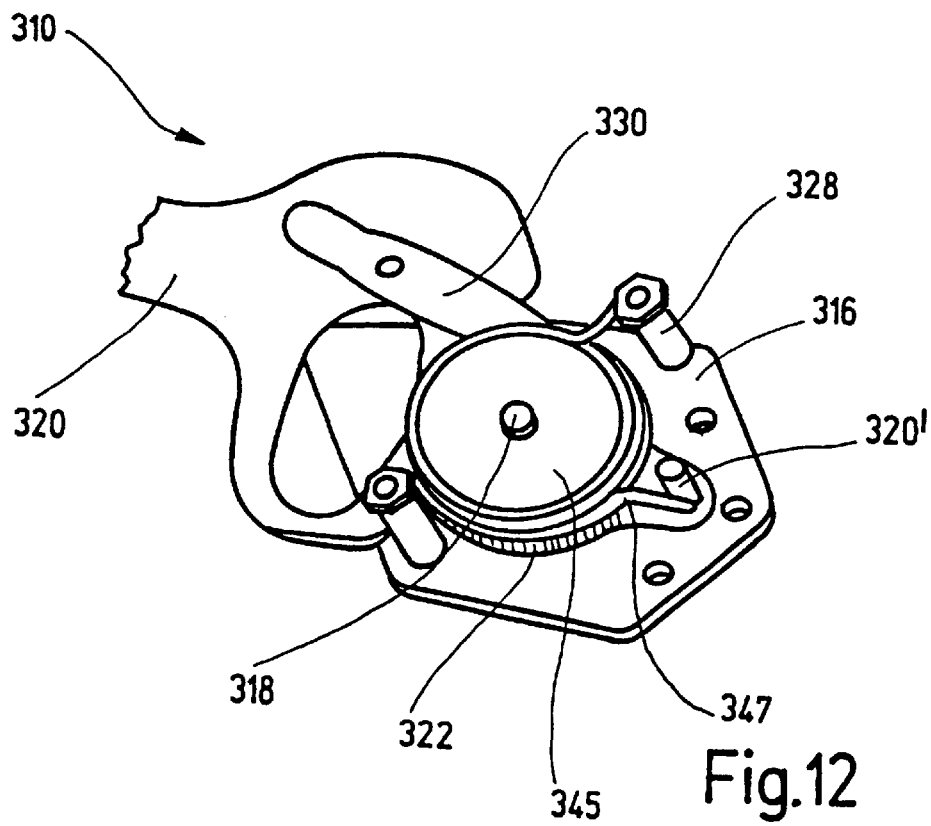
FIG. 12 is a perspective view of a fourth embodiment.
Figure 13:
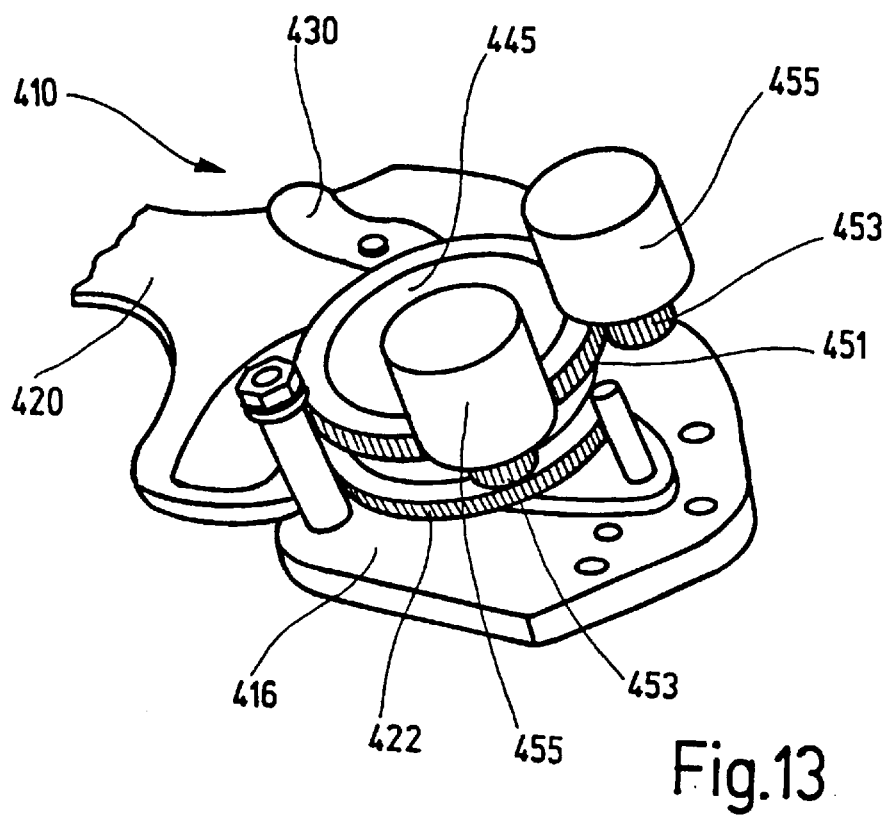
FIG. 13 is a perspective view of a fifth embodiment.

The seat height adjuster drive 210 is actuated by means of an actuation lever 220 shown only schematically. An "upward pumping motion" occurs for raising seat support 203, and a "downward motion" for lowering it. During an "upward pumping motion," the actuation lever 220 first pivots hand lever 227 from a starting position upward. The hand lever 227 mounts a pawl (not shown) in a bore illustrated in FIG. 9 at the lower end of hand lever 227. This pivotal movement causes the pawl to engage the external toothing of entraining gear 222 and to rotate it (counterclockwise in FIG. 9). Via entraining arms 237, the freewheel is released in the direction of rotation, and freewheel casing 214 is entrained after a small no-load stroke. The freewheel casing 214 moves, via pin 218, the pinion 212, which in turn rotates the shaft that raises seat support 203. Thereafter, the actuation lever 220 is pivoted back, thereby returning hand lever 227 and lifting the pawl and displacing it relative to the entraining gear in the circumferential direction. These sequences of motion are repeated accordingly over and over again. In this process, the entraining gear 222 performs no axial movement.

For the "downward motion," hand lever 227 is pivoted via the downward pivoting actuation lever 220. This causes the balls 233 in their guideways 231 to reach the end region of guide tracks 229, which is narrowed such that the balls 233 are pushed in the axial direction toward thrust washer 235. The thrust washer 235 in turn pushes upon entraining gear 222, which is pushed against the force of spring element 239 deeper into freewheel casing 214. Because of wedge surfaces 237', the entraining gear 222 performs with its entraining arms 237 a movement in the circumferential direction in addition to its axial movement (clockwise in FIG. 9), by which it releases the freewheel in this new direction. This allows the pinion 212 to rotate with the shaft. The weight of vehicle seat 201 and of the seat user causes the seat support 203 to lower. A stop, for example, hand lever 227, or the end of guide track 229 prevents the entraining gear 222 from coming in its end position into contact with the freewheel casing 214, so as to avoid excessive axial pressures.

The fourth embodiment relates to a seat height adjuster drive 310, which is identical with the first embodiment, unless otherwise described in the following. Like parts or components having like effects are therefore identified by numerals increased by 300. In the same way as in the other embodiments, a pin 318 supported in a housing plate 316 is corotationally connected to a shaft that is to be driven by seat height adjuster drive 310. A lever 320 drives a gear 322 mounted on pin 318 for rotation therewith by means of a pivotable pawl 330. An existing freewheel, which blocks or releases pin 318 relative to housing plate 316, and the components for its release are not shown in the drawing.

The pin 318 mounts in concentric relationship and for rotation therewith a circular cylindrical disk 345 with a loop spring 347 surrounding its surface area. The inside diameter of the unobstructed loop spring 347 is somewhat smaller than the diameter of the disk 345, so that the loop lies against disk 345 with a bias. One end of loop spring 347 is arranged or secured to housing plate 316, for example, by means of one of spacer pins 328. The other end of loop spring 347 lies freely against a stop pin 320', which is secured to lever 320.

During a downward motion, the tightened loop spring 347 damps, via friction against disk 345, the rotation of pin 318, i.e., it brakes the movement of seat height adjuster drive 310. An adaptation of the bias and/or a suitable material pairing allows to achieve a defined through slippage of the thus-formed frictional damper. When the lever 320 is pivoted upward for an upward pumping motion, the loop spring 347 will be pushed open via stop pin 320', so that the disk 345 and thus pin 318 can be rotated undamped.

The fifth embodiment relates to a seat height adjuster drive 410, which is substantially identical in its construction and function with the fourth embodiment, so that like or like-acting components are identified by numerals increased by 100. In the same way as in the other embodiments, a pin supported in a housing plate 416 mounts a gear 422 for rotation therewith, which is operated by a lever 420 by means of a pivotable pawl 430. The pin under discussion and not shown in the drawing mounts on its surface area a disk 445 with an external toothing. This external toothing engages respectively one coupling gear 453 of two viscose dampers 455.

As speed-dependent brakes, the viscose dampers 455 damp the movement of their respective coupling gear 453, and, thus, via the operative connection, that of seat height adjuster drive 410. The housings of viscose dampers 455 are mounted, for example, to a housing cover not shown. The viscose dampers 455 may be filled with a magnetorheological liquid, whose viscosity is variable as a function of tension, namely switchable. The housings of viscose dampers 455 may also be arranged on pivotable arms, so that they can pivoted away from disk 445 for discontinuing the damping.

The viscose damper 455 may be operative on one or both sides, directly on the shaft, or, as shown in the embodiment, it may operated with an interposed transmission.

What is claimed is:

1. A seat height adjuster drive for a vehicle seat, comprising:
    a drive with a manually actuatable lever mounted for movement from an idle position within two sector ranges that are different from one another, wherein the drive is responsive to movement of the lever within a first of the sector ranges to rotate a rotatable component of the drive and thereby cause movement of the drive in a first adjustment direction;
    a releasable freewheel for releasably blocking rotation of the rotatable component, wherein the releasable freewheel is responsive to movement of the lever through a second of the sector ranges to allow movement of the drive in a second adjustment direction; and
    a switch that engages a guide track, wherein the guide track is mounted for moving with the lever relative to the switch, and the switch is mounted so that the movement of the guide track relative to the switch causes the switch to move a plate cam of the freewheel in a direction opposite to the movement of the lever, so that the freewheel is released to allow rotation of the rotatable component in the direction of the movement of the lever.

2. A seat height adjuster drive according to claim 1, wherein the freewheel is releasable in two directions independently of the drive.

3. A seat height adjuster drive according to claim 1, further comprising control elements mounted for moving at least in part axially relative to the freewheel for switching the freewheel between a blocked state and an at least partially released state.

4. A seat height adjuster drive according to claim 1, wherein the lever is mounted for having a back and forth motion manually imparted thereto while in the first sector range, and the drive is responsive to back and forth motion of the lever in the first sector range to rotate the rotatable component of the drive and thereby cause movement of the drive in the first adjustment direction.

5. A seat height adjuster drive according to claim 1, wherein the freewheel is released while the lever is in the second sector range.

6. A seat height adjuster drive for a vehicle seat, comprising:
    a drive with a manually actuatable lever mounted for movement from an idle position within two sector ranges that are different from one another, wherein the drive is responsive to movement of the lever within a first of the sector ranges to rotate a rotatable component of the drive and thereby cause movement of the drive in a first adjustment direction;
    a releasable freewheel for releasably blocking rotation of the rotatable component, wherein the releasable freewheel is responsive to movement of the lever through a second of the sector ranges to allow movement of the drive in a second adjustment direction;
    a gear mounted for rotating with and driving the rotating component; and
    a pawl for engaging and driving the gear in response to movement of the lever, wherein the pawl is pivotably connected to a guide bar and is thereby also movable independently of the lever.

7. A seat height adjuster drive according to claim 6, further comprising a switch that engages a guide track, wherein the guide track is mounted for moving with the lever relative to the switch, and the switch is mounted so that the movement of the guide track relative to the switch causes the switch to move a plate cam of the freewheel in a direction opposite to the movement of the lever, so that the freewheel is released to allow rotation of the rotatable component in the direction of the movement of the lever.

8. A seat height adjuster drive according to claim 6, further comprising a friction spring for lifting the pawl from the gear, wherein the friction spring opens in response to being entrained by the guide bar, and the friction spring closes in response to coming into contact with the pawl.

9. A seat height adjuster drive according to claim 6, wherein the pawl is mounted so that the pawl can drive the gear only while the lever is in the first sector range.

10. A seat height adjuster drive according to claim 6, wherein the pawl is mounted so that the pawl drives the gear only while the lever is moved downward within the first sector range.

11. A seat height adjuster drive according to claim 6, wherein the rotatable component of the drive is a rotary output shaft of the drive, and the gear is connected to the rotary output shaft for rotation therewith.

12. A seat height adjuster drive according to claim 11, wherein the gear is fixedly mounted on a pin for rotation therewith, the pin is connected to the rotary output shaft for rotation therewith, and the guide bar is pivotably mounted on the pin.

13. A vehicle seat, comprising:
   an adjustable seat support, which carries structure of the vehicle seat;
   a drive connected to the seat support and including a manually actuatable lever mounted for movement from an idle position within two sector ranges which are different from one another, wherein the drive is responsive to movement of the lever within a first of the sector ranges to rotate a rotatable component of the drive and thereby cause movement of the seat support in a first adjustment direction;
   a releasable freewheel for releasably blocking rotation of the rotatable component, wherein the releasable freewheel is responsive to movement of the lever through a second of the sector ranges to allow movement of the seat support in a second adjustment direction; and
   a switch that engages a guide track, wherein the guide track is mounted for moving with the lever relative to the switch, and the switch is mounted so that the movement of the guide track relative to the switch causes the switch to move a plate cam of the freewheel in a direction opposite to the movement of the lever, so that the freewheel is released to allow rotation of the rotatable component in the direction of the movement of the lever.

14. A vehicle seat according to claim 13, wherein the freewheel is releasable in two directions independently of the drive.

15. A vehicle seat according to claim 13 further comprising:
   a gear mounted for rotating with and driving the rotating component; and a pawl for engaging and driving the gear in response to movement of the lever, wherein the pawl is pivotably connected to a guide bar and is thereby also movable independently of the lever.

16. A seat height adjuster drive for a vehicle seat, comprising:
   a drive with a manually actuatable lever mounted for movement from an idle position within two sector ranges that are different from one another, wherein the drive is responsive to movement of the lever within a first of the sector ranges to rotate a rotatable component of the drive and thereby cause movement of the drive in a first adjustment direction;
   a releasable freewheel for releasably blocking rotation of the rotatable component, wherein the releasable freewheel is responsive to movement of the lever through a second of the sector ranges to allow movement of the drive in a second adjustment direction; and
   control elements mounted for moving at least in part axially relative to the freewheel for switching the freewheel between a blocked state and an at least partially released state.

17. A seat height adjuster drive according to claim 16, wherein the freewheel is released in at least one direction of rotation by transforming the axial movement of the control elements into a movement in a circumferential direction.

18. A seat height adjuster according to claim 16, wherein balls move in and along guide tracks that have an inconstant cross section in the axial direction, and the movement of the balls along the guide tracks causes the axial movement of the control elements.

19. A seat height adjuster for a vehicle seat, comprising:
   a drive with a manually actuatable lever mounted for movement from an idle position within two sector ranges that are different from one another, wherein the drive is responsive to movement of the lever within a first of the sector ranges to rotate a rotatable component of the drive and thereby cause movement of the drive in a first adjustment direction;
   a releasable freewheel for releasably blocking rotation of the rotatable component, wherein the releasable freewheel is responsive to movement of the lever through a second of the sector ranges to allow movement of the drive in a second adjustment direction; and
   means for damping the movement of the seat height adjuster drive in at least one of the first and second adjustment directions.

20. A seat height adjuster drive according to claim 19, further comprising a switch that engages a guide track, wherein the guide track is mounted for moving with the lever relative to the switch, and the switch is mounted so that the movement of the guide track relative to the switch causes the switch to move a plate cam of the freewheel in a direction opposite to the movement of the lever, so that the freewheel is released to allow rotation of the rotatable component in the direction of the movement of the lever.

21. A vehicle seat, comprising:
   an adjustable seat support, which carries structure of the vehicle seat;
   a drive connected to the seat support and including a manually actuatable lever mounted for movement from an idle position within two sector ranges which are different from one another, wherein the drive is responsive to movement of the lever within a first of the sector ranges to rotate a rotatable component of the drive and thereby cause movement of the seat support in a first adjustment direction;
   a releasable freewheel for releasably blocking rotation of the rotatable component, wherein the releasable freewheel is responsive to movement of the lever through a second of the sector ranges to allow movement of the seat support in a second adjustment direction; and
   control elements mounted for moving at least in part axially relative to the freewheel for switching the freewheel between a blocked state and an at least partially released state.

22. A vehicle seat according to claim 21, further comprising a switch that engages a guide track, wherein the guide track is mounted for moving with the lever relative to the switch, and the switch is mounted so that the movement of the guide track relative to the switch causes the switch to move a plate cam of the freewheel in a direction opposite to the movement of the lever, so that the freewheel is released to allow rotation of the rotatable component in the direction of the movement of the lever.

23. A seat height adjuster drive for a vehicle seat, comprising:
   a drive with a manually actuatable lever mounted for movement from an idle position within two sector ranges, wherein the two sector ranges are positioned on opposite sides of the idle position and do not substantially overlap, and wherein the drive is responsive to movement of the lever within a first of the sector ranges to rotate a rotatable component of the drive in a first direction and thereby cause upward movement of the drive; and
   a releasable freewheel for releasably blocking rotation of the rotatable component, wherein the releasable freewheel is responsive to movement of the lever through a second of the sector ranges, which is different from the first sector range, to allow rotation of the rotatable component in a second direction and thereby allow downward movement of the drive, and wherein the first sector range is larger than the second sector range.

24. A seat height adjuster drive according to claim 23 in combination with the vehicle seat, with the combination further comprising:

an adjustable seat support, which carries structure of the vehicle seat and is connected to the seat height adjuster drive so that the seat support moves upward in response to the rotation of the rotatable component in the first direction and the seat support is at least allowed to move downward in response to the rotation of the rotatable component in the second direction.

25. A seat height adjuster drive for a vehicle seat, comprising:

a drive with a manually actuatable lever mounted for movement from an idle position within two sector ranges that are different from one another, wherein the drive is responsive to movement of the lever within a first of the sector ranges to rotate a rotatable component of the drive and thereby cause movement of the drive in a first adjustment direction; and a releasable freewheel for releasably blocking rotation of the rotatable component, wherein the releasable freewheel is responsive to movement of the lever through a second of the sector ranges to allow movement of the drive in a second adjustment direction, wherein the first and second sector ranges:
 are positioned on opposite sides of the idle position,
 do not substantially overlap, and
 have different magnitudes.

* * * * *

UNITED STATES PATENT AND TRADEMARK OFFICE
CERTIFICATE OF CORRECTION

PATENT NO. : 6,592,186 B1 Page 1 of 1
DATED : July 15, 2003
INVENTOR(S) : Mühlberger et al.

It is certified that error appears in the above-identified patent and that said Letters Patent is hereby corrected as shown below:

Title page,
Item [56], References Cited, U.S. PATENT DOCUMENTS, insert the following:

-- 5,918,714    7/1999    Kadereit --.

Signed and Sealed this

Eleventh Day of November, 2003

JAMES E. ROGAN
*Director of the United States Patent and Trademark Office*